April 14, 1964   M. J. HOBERMAN   3,128,946
TEMPERATURE CONTROLLED FUEL VALVE FOR A JET ENGINE
Filed Feb. 4, 1959   2 Sheets-Sheet 2

INVENTOR.
MAX J. HOBERMAN
BY
ATTORNEYS

United States Patent Office 3,128,946
Patented Apr. 14, 1964

3,128,946
TEMPERATURE CONTROLLED FUEL VALVE
FOR A JET ENGINE
Max J. Hoberman, Fair Lawn, N.J., assignor, by mesne assignments, to Engelhard Industries, Inc., Newark, N.J., a corporation of Delaware
Filed Feb. 4, 1959, Ser. No. 791,120
1 Claim. (Cl. 236—78)

This invention relates to temperature control systems and more particularly to electrical control systems for engines.

The principal objective of the present invention is the improvement in the capabilities of control systems for regulating the temperature and power output of engines, particularly of the jet type.

The arrangements in accordance with the present invention provide an entirely alternating current controlled system for developing and combining signals representing (1) the selected or desired temperature of the engine; (2) the actual temperature of the engine; and (3) the position of the throttle of the engine. In this context, one feature of the invention involves the provision of circuitry for varying the gain constant of the signals representing the throttle position, thus changing the magnitude of the throttle displacement for a given difference between the selected and the actual engine temperatures.

Other features of the invention which contribute to the overall efficiency of the system will now be set forth.

Initially, the circuit for providing an alternating current signal, having a magnitude which varies in accordance with the temperature of the engine, includes an alternating current Wheatstone bridge arrangement having an offset biasing resistor. Alternating current responsive magnetic amplifiers are employed in combination with two-phase synchro motors to provide reversible mechanical movement in accordance with the phase and magnitude of applied signals. In this combination, the use of a linear variable differential transformer to generate a voltage having a magnitude proportional to the displacement of the throttle of the engine is also considered to be particularly advantageous.

Figure 1:
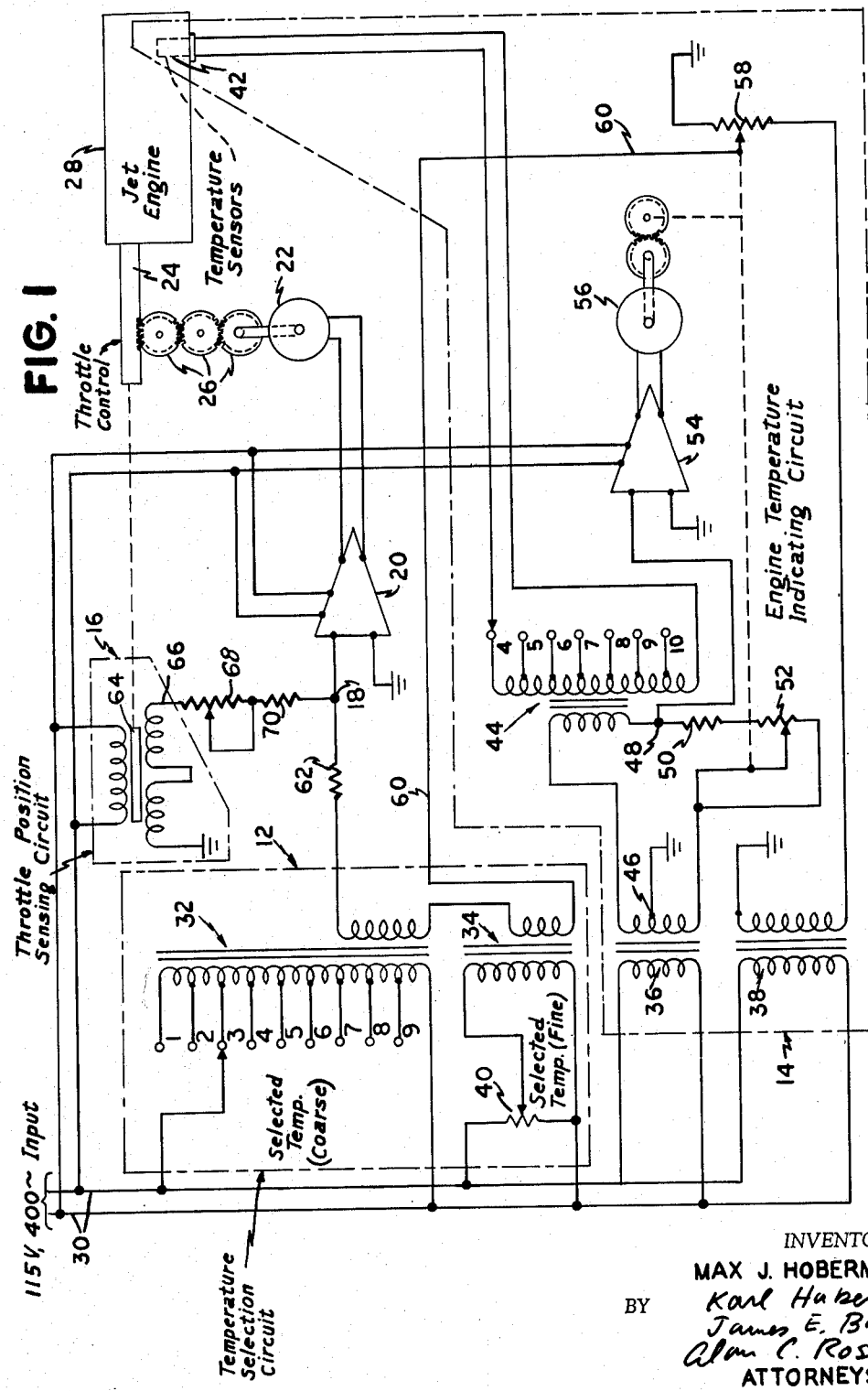
Figure 2:
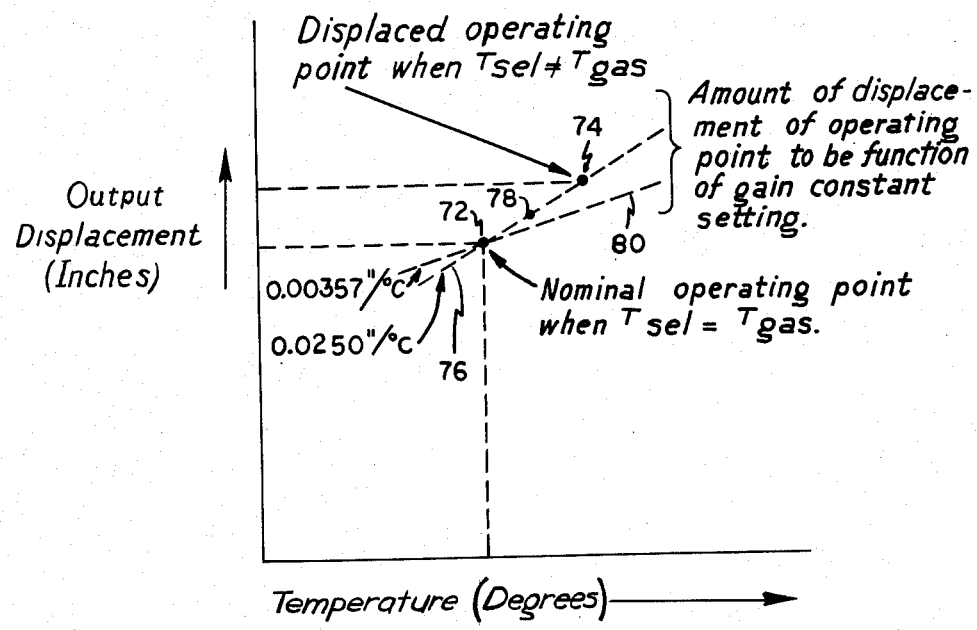

Other objects, features and advantages of the present invention will become apparent from a consideration of the following detailed description and from the accompanying drawings, in which, FIGURE 1 is a circuit diagram of the temperature control system in accordance with the invention; and FIGURE 2 is a plot of output displacement of the engine throttle plotted against the temperature in degrees, and indicates the mode of operation of the circuit of FIGURE 1.

With reference to the illustrative circuit of FIGURE 1, three distinct control voltages are developed by the temperature selection circuit 12, the engine temperature indicating circuit 14, and the throttle position sensing circuit 16. Signals derived from these three circuits are summed at circuit point 18 and applied to the magnetic amplifier 20. Output signals from the magnetic amplifier 20 are applied to the two-phase motor 22, which controls the position of a throttle mechanism 24 through the gear train 26. Accordingly, the temperature of the jet engine 28 is controlled so that it approaches the selected temperature as set in circuit 12.

Now that the functional mode of operation of the circuit of FIGURE 1 has been outlined, the operation of the individual circuits forming the complete system will be considered. Initially, standard 115 volt, 400 cycle alternating current input signals from an airplane power system are supplied to leads 30. These signals are applied to the primary winding of the linear variable differential transformer included in the throttle position sensing circuit 16. Alternating current signals are also supplied to the primary windings of transformers 32 and 34 included in the temperature selection circuit 12. These reference voltage signals from the input lines 30 are also supplied to transformers 36 and 38 in the engine temperature indicating circuit.

The transformer 32 is provided with a number of input taps 1 through 9 which range from a low temperature of approximately 950° F. at terminal 1 to a high temperature of approximately 1750° F. at terminal 9 in 100 degree steps. The fine temperature control is provided by the rheostat 40. By varying the signal voltage applied to transformer 34, the total alternating current voltage developed at the secondaries of transformers 32 and 34 will represent any desired temperature from 950 to 1850 degrees.

The temperature of the jet engine 28 is sensed by a group of temperature sensing elements represented schematically by the probe 42. These probes may be connected in series or parallel to the secondary of transformer 44 forming part of the engine temperature indicating circuit 14. Four to ten probes may be used, and they may be connected to the secondary taps to present the desired impedance at the primary of transformer 44. An alternating current bridge circuit is coupled to the secondary of transformer 36. The balance points of the bridge circuit include the grounded center tap 46 on the secondary of transformer 36 and the point 48 between the primary of transformer 44 and the resistor 50. The resistance of the temperature sensing elements 42 is reflected through the transformer 44 and is presented in the primary winding of transformer 44 to form one leg of the resistance bridge. The combined resistance of the resistor 50 and the variable resistor 52 is balanced against that presented by the primary of transformer 44. The magnetic amplifier 54 is connected across points 46 and 48 of the Wheatstone bridge. When the resistance of the branch of the Wheatstone bridge including the resistors 50 and 52 is greater than the resistance presented by the primary of transformer 44, one phase of alternating current is applied to the magnetic amplifier 54. When the balance of the Wheatstone bridge shifts in the other direction, however, the phase of the alternating current signals applied to the magnetic amplifier 54 is shifted by 180 degrees. The motor 56 associated with magnetic amplifier 54 operates in opposite directions in accordance with the phase of the signals applied to it from the magnetic amplifier 54. In addition, it is connected mechanically to the variable resistor 52 to rebalance the Wheatstone bridge whenever it becomes unbalanced.

From the foregoing description, it is clear that the angular position of the arm of potentiometer 52 corresponds to the average resistance of the sensing elements 42, or the average temperature of the jet engine. Since this angular position is not a linear function of temperature due to the non-linearity of the resistance versus temperature characteristic of the sensing elements, another potentiometer 58 is directly ganged to potentiometer 52. The potentiometer 58 is a non-linear potentiometer wound with an inverse characteristic so that the voltage generated between the movable arm and the ground point of potentiometer 58 is now a linear function of temperature.

It should now be noted that the secondary of transformer 38 is wound in an inverse sense with respect to the secondaries of transformers 32 and 34. Accordingly, the voltage on lead 60 is in phase opposition to that generated in the secondary windings of transformers 32 and 34. The signals applied to resistor 62 at the input to magnetic amplifier 20, therefore, represent the difference between the selected temperature as determined in circuit 12 and the actual engine temperature as developed in circuit 14.

At this point it is considered desirable to introduce a mathematical formula indicating the equation which the circuit of FIGURE 1 is designed to solve:

$$CF_{PL} - (T_{SEL} - T_{GAS}) = 0 \qquad (1)$$

where $T_{SEL}$ = selected temperature
$T_{GAS}$ = gas temperature
$C$ = system constant
$F_{PL}$ = plunger position Now, with different positions of the plunger 24, the magnetic core member 64 of the differential transformer will shift and produce different output signals on lead 66 at the output of the throttle position sensing circuit 16. The signals from the sensing circuit 16 are applied to the variable resistor 68 and the fixed resistor 70 and are combined with the temperature difference signals at circuit point 18 at the input to the magnetic amplifier 20.

The mode of operation of the circuit of FIGURE 1 may conveniently be described with reference to FIGURE 2. In FIGURE 2 the point 72 represents the nominal position of the throttle plunger 24 for a given temperature in degrees when the selected temperature is equal to the actual temperature of the gases in the jet engine. When the selected temperature is no longer equal to the engine gas temperature, however, the displacement of the throttle shifts to point 74 as shown in FIGURE 2, along the operating line 76. Thus, for example, the operating point 74 represents a situation in which the selected temperature is significantly greater than the present operating temperature of the engine, and one which has produced a greater displacement of the throttle to permit an increased flow of fuel to the jet engine. In due course, as the engine reaches the new temperature, the throttle displacement will be reduced and a new operating point perhaps in the vicinity of point 78 on line 76 will be reached.

The slope of line 76 which determines the magnitude of the throttle displacement at a given temperature difference is determined by the setting of variable resistor 68 which determines the loop gain constant for the throttle position sensing circuit. As indicated in FIGURE 2, the line 76 represents a slope of 0.025 inch of displacement per degree centigrade of temperature difference. With another setting of the variable resistor 68, the slope line 80 would be obtained. Under these conditions the displacement would be 0.00357 inch per degree centigrade.

It is to be understood that the above described arrangements are illustrative of the application of the principles of the invention. Numerous other arrangements may be devised by those skilled in the art without departing from the spirit and scope of the invention.

What is claimed is:

In a heat control circuit, means for providing a selectively variable alternating current signal representing the desired temperature, said means including a transformer having a tapped primary winding for coarse control, another transformer for fine temperature control having its secondary in series with the secondary of the first transformer, and a variable resistor for controllably energizing the primary winding of the fine control transformer; means including a linear variable differential transformer for providing an alternating current signal indicating the position of a fuel supply valve; means for providing another alternating current signal having a magnitude which is a linear function of the actual temperature, said last mentioned means including an alternating current Wheatstone bridge, a transformer and a variable resistor connected in the respective branch circuits of said bridge, a fixed resistor connected in the branch circuit with said variable resistor, a plurality of temperature sensing thermoelements connected to the secondary of the transformer in the Wheatstone bridge circuit, electrically controlled rebalancing means for controlling the variable resistance in said Wheatstone bridge circuit, and a non-linear resistance mechanically connected to said rebalancing means for correcting for the non-linearity of the temperature sensing thermoelements; valve position control circuitry; means for combining said three alternating current signals, with the signals representing the selected and the actual temperature being combined in phase opposition, and for applying the resultant voltage to the valve control circuitry; and means including a variable resistor for varying the magnitude of the valve position displacement signals with respect to the signals representing the selected and the actual temperatures.

References Cited in the file of this patent

UNITED STATES PATENTS

| | | |
|---|---|---|
| 2,275,317 | Ryder | Mar. 3, 1942 |
| 2,739,441 | Baker et al. | Mar. 27, 1956 |
| 2,766,584 | Stockinger | Oct. 16, 1956 |
| 2,777,640 | Kaufman | Jan. 15, 1957 |
| 2,786,330 | Brandau | Mar. 26, 1957 |
| 2,790,303 | Kutzler | Apr. 30, 1957 |
| 2,835,450 | Brown et al. | May 20, 1958 |
| 2,953,899 | Sorensen | Sept. 27, 1960 |